Inventors
Aladar Hollander
Vaino A. Hoover
By Lyon & Lyon
Attorneys

Patented July 22, 1941

2,249,763

UNITED STATES PATENT OFFICE 2,249,763

SEALING DEVICE

Aladar Hollander and Vaino A. Hoover, Los Angeles, Calif., assignors to Byron Jackson Co., Huntington Park, Calif., a corporation of Delaware Application December 8, 1937, Serial No. 178,739

13 Claims. (Cl. 286—9)

This invention relates to a sealing device, and more particularly to a liquid seal adapted to seal the juncture of a rotating shaft and a stationary member.

The invention has particular utility in sealing the juncture of the drive shaft of a submersible electric motor and the shell in which the motor is housed and through which the shaft projects. The shell when in use is immersed in a surrounding liquid, and is filled with a dielectric liquid to protect the motor windings. The liquid seal is interposed between the external and internal liquids to prevent admixture thereof and consequent reduction of the dielectric strength of the internal liquid.

The seal which has been found to be most effective for this purpose comprises, generally, a rotating cup secured to the shaft and containing a body of mercury or other liquid of relatively high specific gravity, and an apron or baffle secured to the stationary shell and dipping into the mercury to divide the surface thereof into two surfaces on opposite sides of the baffle, one surface being in contact with each liquid. Any admixture of internal and external liquid must, therefore, result from migration of one or both of these liquids through the body of mercury. Experience has proven that such migration does in fact occur, unless special precautions are taken to prevent it. When it is considered that submersible motors are in all other respects capable of remaining submerged for long periods of time, it will be appreciated that any migration of liquid through the seal, even at an infinitesimal rate, constitutes a serious defect.

It is, therefore, a principal object of this invention to reduce the possibility of migration of either internal or external liquid through the sealing liquid of a seal interposed between a rotating member and a stationary member. In the present invention this object is attained by establishing a barrier adjacent each surface of contact between the sealing liquid and the internal and external liquids, whereby the latter are prevented from migrating into the sealing liquid to any substantial extent. In this way, a body of substantially pure sealing liquid is maintained at the juncture of the two portions of the seal.

A further object of this invention is to set up adjacent each surface of contact a localized circulation within the sealing liquid, the direction and nature of the circulation being such as to oppose entrance of foreign matter into the mercury beyond the region of such circulation.

More specifically, a preferred embodiment of the invention utilizes the pumping action produced by rotating surfaces having radial components, to set up within the body of sealing liquid local countercurrents in proximity to the surfaces of contact between the sealing liquid and the internal and external liquids. Of particular importance is the establishment of a countercurrent adjacent the rotating shaft and in proximity to the surface of contact between the sealing liquid and the external liquid, whereby any external liquid tending to move downwardly around the shaft is swept therefrom by the counter-current and returned to the surface by the centrifugal separating action of the heavier sealing liquid.

When a liquid seal of the type referred to is rotated at the high speeds characteristic of electric motors, the powerful centrifugal force produced causes the heavy sealing liquid, which is usually mercury, to be forced outwardly against the periphery of the receptacle, forming a paraboloidal vortex around the rotating member, the vortex becoming filled with the external liquid. In prior seals, no attempt has been made to so proportion the diameters of the mercury chamber and of the outlets therefrom as to avoid the formation of such a vortex and the consequent admission of a substantial quantity of external liquid into the space normally occupied by the mercury when at rest.

A further object of this invention is to provide a seal wherein the displacement of mercury is materially reduced, and wherein the height of the surfaces of contact between the mercury and the liquids to be isolated is also greatly reduced. Both of these objects are attained by disposing the annular chamber radially outwardly of the larger of the two passages communicating with the interior of the chamber.

Other objects and advantages will be apparent from a study of the following specifications, read in connection with the accompanying drawings, wherein Fig. 1 is a vertical sectional view, showing the seal mounted in a motor casing;

Figure 1:
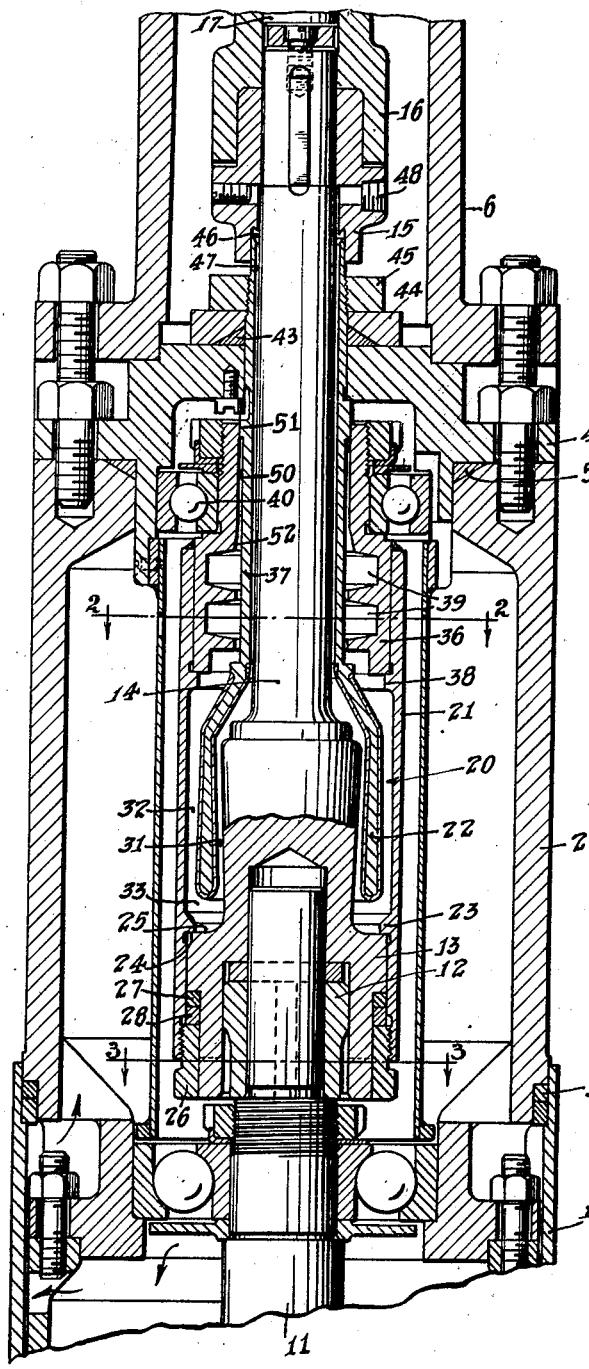
Figure 2:
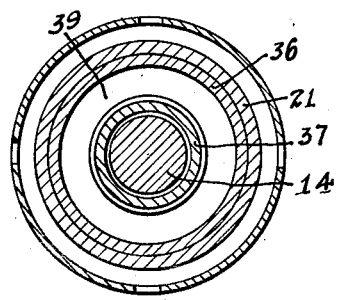
Fig. 2 is a horizontal section, taken in the line 2—2 of Fig. 1.
Figure 3:
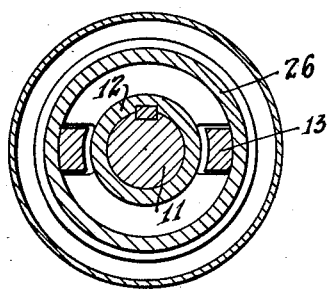
Fig. 3 is a horizontal section, taken in the line 3—3 of Fig 1.

Referring to the drawings, Fig. 1 shows a preferred form of seal, incorporated in a submersible electric motor, especially adapted for use with a well pump. The motor (not shown) is encased in a fluid-tight shell 1, to which is secured an upper extension housing 2, the shell and housing being sealed by a fluid-tight joint 3. A seal mounting bracket 4 is bolted or otherwise detachably secured to the upper end of the housing, and is sealed thereto by a gasket 5. An adapter 6, mounted above the bracket, supports the motor assembly in axial alinement with a pump (not shown) mounted above the adapter.

The rotor shaft 11 of the motor extends into the housing 2 and is operatively connected by complementary interengaging coupling members 12 and 13 to an intermediate shaft 14, which for convenience will be termed the seal shaft. As shown, the driven coupling member 13 is formed integral with shaft 14. The upper end of the seal shaft is operatively connected by coupling members 15 and 16 to a pump shaft 17. Inasmuch as the shaft arrangement and the mounting of the seal are described more in detail and claimed in our copending application Serial No. 178,741, filed concurrently herewith now Patent No. 2,171,749 issued September 5, 1939, they will be only briefly described herein.

The liquid seal, designated generally by reference character 20, consists primarily of the shaft 14, a cylindrical shell 21, and an apron or baffle 22. The shell 21 has an inwardly projecting flange 23 formed on its inner periphery and provided with a machined lower radial face 24 which seats on a radial face machined on a shoulder 25 formed at the juncture of shaft 14 and coupling member 13. The shell 21 extends downwardly around the coupling member with a close sliding fit, and is threadedly engaged by a clamping nut 26 to firmly engage the surfaces 24 and 25 together. In this manner the shell 21 is rigidly secured in concentric relation to the shaft. A gasket 27 is confined within a recess between the shell and the coupling member and, when compressed by a gasket ring 28 engaged by the clamping nut 26, forms a fluid-tight joint between these two members. The shoulder 25 forms the base of an annular channel defined by the shell 21 and the shaft 14, the channel being devided by the baffle 22 into an inner primary zone 31 and an outer secondary zone 32, the baffle terminating a short distance above the base of the channel to provide a zone 33 communicating with zones 31 and 32.

Disposed within and secured to the upper end of shell 21 is an annular seal mounting member 36, the inner periphery of which is spaced from shaft 14 a sufficient distance to accommodate the upper cylindrical portion 37 of the apron 22. The member 36 is welded to the shell to form a fluid-tight connection therewith, and rests on an inwardly projecting flange 38 formed on the shell. Radially inwardly opening cavities or pockets 39, forming overflow channels for the mercury, are provided in member 36. An antifriction bearing 40 rotatably supports the member 36, and hence the shell 21 and shaft 14, in the mounting flange 4.

The cylindrical portion 37 of the baffle protrudes through the flange 4 and is sealed thereto by a gasket 43 confined within a ring 44, the baffle being secured to flange 4 by a nut 45 threaded thereon. The baffle extends upwardly around the shaft and terminates within a recess 46 formed in the upper seal shaft coupling member 15, and is spaced from shaft 14 throughout its cylindrical portion 37 to produce a narrow channel 47 around the shaft. A mercury filler opening 48 extends radially through coupling member 15 and communicates with channel 47, providing means for filling the seal chamber with mercury. After filling, the opening 48 is closed by a plug. The projection of the upper end of the baffle within the downwardly opening recess 46 insures against entry of sand or other foreign solids into the annular space 47 leading to the mercury chamber.

An annular space 50 is provided between the outer periphery of the upper baffle portion 37 and the mounting member 36, through which the liquid filling the housing 2 and shell 1 may enter the outer zone 32 of the seal chamber. This annular space is constricted at 51 to a very small clearance, the constriction serving as a throttling means, the purpose of which will be explained hereinafter. The lower end of passage 50 is flared outwardly, as indicated at 52, for a purpose which will also be explained below.

Figure 4:
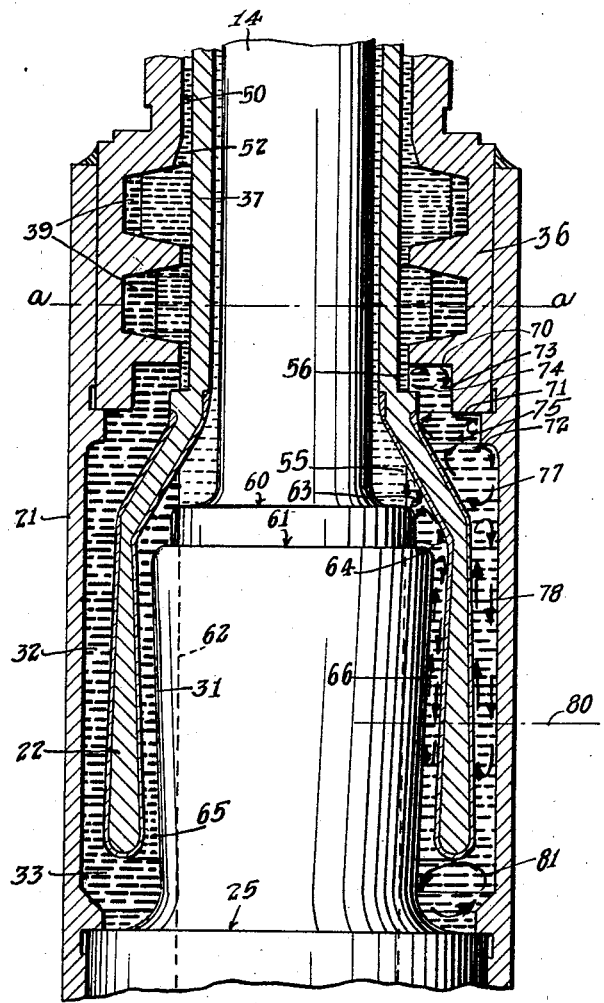
Fig. 4 is a vertical sectional view of the seal illustrating the conditions therein during rotation.

Before placing the motor in operation, the seal chamber is filled with mercury through the filler opening 48 to approximately the level shown at $a-a$ in Fig. 4, and the motor shell 1 and housing 2 are filled with a dielectric liquid such as oil, the latter entering the annular space 50 and filling this space and a part of the pockets 39. When the unit is submerged in water, for example, the latter enters the channel 47 down to the mercury level. Upon starting the motor the rotation of shaft 14 and shell 21 causes the mercury to rotate therewith, centrifugal action causing the mercury level in the inner zone 31 to drop to the position shown at 55 in Fig. 4, and shifting the level in the outer zone to the position shown in Fig. 4, wherein 56 designates the lowermost portion of the contact surface in the outer zone. The surfaces of contact between the mercury and oil at 56, and between the mercury and water at 55, assume substantially vertical positions, that at 56 being substantially flush with the inner periphery of the mounting member 36 and that at 55 being substantially vertically beneath the former, the surfaces 55 and 56 lying in a paraboloid coaxial with shaft 14. The displaced mercury will overflow into pockets 39 and will be retained therein during rotation. The downwardly and outwardly flared portion 52 at the lower extremity of the passage 50 creates a pumping action exerting pressure downwardly against any emulsion of mercury and oil which might otherwise rise in passage 50. The minute globules of mercury will be separated from the oil and thrown outwardly against the inclined wall 52, where they will be forced downwardly into the upper overflow chamber. The characteristically high rate of acceleration of the motor when first energized would throw a considerable portion of the mercury up into the pockets 39 and possibly up through the annular space 50 and into the housing 2, were it not for the provision of throttling means 51 in the passage 50. A close running fit of only a few thousandths of an inch is provided at 51, serving as a dashpot to check the upward surge of mercury by throttling the passage of oil therethrough. This throttling effect is of particular importance in a seal such as that disclosed, wherein the locations of the surfaces of contact 55 and 56 are predetermined. If the overflow of oil were not checked, the initial surge created when the motor is started would cause the water-mercury surface 55 to drop below the desired point, instead of gradually approaching it as is the case with the provision of the throttling passage 51.

As previously stated, when the mechanism is at rest, the level of the mercury is preferably above the bottom of the lowermost of the two pockets 39 at substantially the level a—a. When the pump is running, however, the mercury surrounding the shaft 14 moves downwardly to the line 55, thereby displacing part of the mercury in the exterior zone 32 over the flange defining the lower wall of the lowermost pocket 39, into that pocket. By initially providing an excess of mercury in the spaces 31 and 32, and providing for the overflow of the mercury into the pockets 39, a substantially constant supply of mercury in the spaces 31 and 32 is secured when the device is rotating. In order to achieve this result, it is merely necessary to maintain the level of the mercury when the device is at rest, somewhere above the lower wall of the lowermost pocket 39, thereby eliminating the necessity of accurately gauging the amount of mercury inserted into the device.

An important feature of this invention, constituting a radical departure from the design of prior seals, is the location of the seal chamber wholly radially outside the passage 50. This is accomplished in the illustrated embodiment by enlarging the shaft 14 from a point below the mercury level to the base of the chamber. As shown, a series of stepped enlargements forming shoulders 60 and 61 increases the inner diameter of the seal chamber to exceed that of the member 36. In this way a downward projection of the paraboloidal surface assumed by the mercury surfaces when rotated, would lie wholly within the enlarged portion of the shaft.

At the rotative speeds employed, the apex of the paraboloid is actually several feet below the seal, and consequently, within the vertical limits of the seal, the extension of the paraboloidal surface is substantially vertical, as shown in dotted lines at 62 in Fig. 4. Since the main body of mercury is always disposed outside the aforesaid paraboloidal surface, even when at rest, very little displacement takes place upon rotation of the mercury—only that required to move the surface 55 from the level a—a to the position indicated in Fig. 4. As a result, only a relatively small quantity of external liquid is admitted to the space normally occupied by mercury when at rest.

As stated previously, an outstanding feature of this invention is the establishment of a barrier in proximity to each of the surfaces 55 and 56, opposing the entrance of water or oil into the mercury to any substantial extent. In the present instance, this barrier is formed by the creation of eddy currents in the mercury, the particles traveling in orbits which are closed in planes extending through the axis of the shaft. These eddy currents are created by utilizing the pumping action produced by rotating surfaces having radial components. In the inner primary zone 31 the rotating element is the shaft 14, and the shoulders 60 and 61 formed thereon at the points of enlargement of the shaft provide such radial surfaces. The shoulder 60 produces an eddy current, shown by arrows 63, while shoulder 61 produces a second eddy current indicated by arrows 64. Enlarging the shaft at the upper portion of the mercury chamber has the further advantage of making it possible to taper the shaft downwardly from the shoulders to the base of the chamber, the upwardly flaring conical surface 65 producing a pumping action which creates upward flow of mercury along the shaft, as indicated at 66, in opposition to the aforementioned tendency of the water to work its way downwardly around the shaft.

The shoulder 60 is so proportioned as to extend radially beyond the inner periphery of the member 36, thus insuring that the lower edge of the fluid-contact surface 55 will rest on this shoulder, limiting the height of this surface of contact between the mercury and water to a relatively short distance. The powerful centrifugal separating action produced by the rotation of the much heavier mercury at high speed counteracts any tendency toward emulsification of mercury and water; however, should any minute particles of water be picked up by the mercury at the surface of contact, they would be carried outwardly away from the shaft by the eddy current 63 and deflected upwardly by the baffle 22, and subsequently squeezed out of the mercury by the centrifugal separating action. Any water tending to seep along the surface of the shaft between the latter and the mercury would likewise be swept into the eddy current. The eddy currents 64 and 66 constitute additional safeguards against migration of water downwardly to the communicating zone 33.

The outer zone 32 is similarly protected against migration of oil downwardly through the mercury or between the mercury and the outer surfaces of the baffle. The radial surfaces 70, 71 and 72 formed on the member 36 and shell 21 produce a pumping action which creates eddy currents in the mercury similar to those indicated by arrows 63 and 64, except that their direction is counter to the direction of the latter because of the fact that the radial surfaces are above the eddy currents instead of below them. A single continuous surface from the inner periphery of member 36 to the outer wall of the chamber would produce an effective eddy current, but breaking up the surface into the series of stepped surfaces 70, 71 and 72, as shown, has advantages over a single surface. In the arrangement shown, the mercury moving outwardly along surface 70 impinges on the annular surface 73 and is turned back toward the baffle, establishing a closed circulation indicated by arrows 74. Likewise, a separate eddy current, indicated by arrow 75, is set up by radial surface 71 and annular surface 76. A third eddy current is also established between the wall of the chamber and the baffle, as indicated at 77. By breaking up a single eddy current into a plurality thereof in the manner shown, the velocity of the currents, and consequently the likelihood of inclusion of particles of oil, are reduced. Furthermore, a plurality of separate eddy currents in series is obviously a more effective barrier than a single eddy current.

By providing a baffle of downwardly increasing thickness, the inner surface thereof converges downwardly while the outer surface converges upwardly. It will be understood that the lighter liquid is forced radially inwardly by the centrifugal separating action, and, when in contact with a conical stationary surface, tends to move in the direction of the smaller diameter, the reverse of what takes place adjacent a conical rotating surface. Thus the eddy currents 66 and 78 are produced in the mercury space alongside the lower skirt portion of the baffle, the circulation being upward along the outer, upwardly converging baffle surface in the outer zone 32, and downwardly along the inner surface of the baffle and upwardly along the upwardly flaring shaft, in the inner zone 31.

Since the aforementioned conical surfaces have only small radial components, the circulation produced alongside the skirt of the baffle is relatively slow. For this reason this space is made relatively long, in order to provide sufficient time for any particles of lighter liquid in this area to be forced radially inwardly by the heavier mercury before they reach the lower end of the circulation path, and to be carried upwardly by the rising current of mercury adjacent the inner wall of each zone.

By reason of the establishment of eddy current barriers as described, a body of pure mercury is maintained in the lower portion of the seal chamber, in any event, the pure mercury extending at least to the level indicated at 80. An additional eddy current will be created at 81 by reason of the shoulder 25, but this circulation is also of minor importance since it occurs in pure mercury.

In addition to the improved sealing effect described above, the construction shown has other distinct advantages over prior seals. The lengths of the liquid to liquid contacting surfaces have been very materially reduced, resulting in a proportionate reduction in the tendency to emulsification of liquids at the contact surfaces.

The provision of short, vertical, liquid to liquid contact surfaces has the further advantage of eliminating rotative speed as a variable factor affecting the nature of the seal. Throughout the full range of practical speeds, the contact surfaces will remain substantially fixed since they are confined to very short portions of the upper region of the paraboloid. Reference to Fig. 4, and to line a—a thereon will also show the relatively slight change in the level of the contacting surfaces when rotating as compared with the stationary level; the amount of water in the seal when rotating is only slightly greater than when stationary. By providing pockets 39 of relatively large capacity, even very material variations in the amount of mercury provided will have little effect on the standing level of the mercury, as indicated at a—a in Fig. 4; also, by reason of the small volume of the annular space 47 between the shaft and the upper baffle portion 37, a substantial change in the level of the surface of contact between the water and mercury results in the displacement of only a relatively small amount of mercury. Also, the amount of mercury employed in the seal is only a small fraction of that used heretofore, and, because of the slight displacement of mercury resulting from rotation, substantially the entire amount is utilized rather than being displaced out of the direct line of communication between the two contacting surfaces, as in prior seals. It will be observed also that the minimum diameter of the enlarged portion of the shaft 14 is greater than the inner diameter of the mounting member 36, thus precluding the possibility of the contact surface between the mercury and water being projected downwardly below the shoulders 60 or 61.

While the novel features of this invention have been illustrated and described as applied to a liquid seal in which the mercury chamber is secured to and rotated with the rotating shaft, and the baffle is secured to the stationary housing, it is obvious that this is only one of many applications of the underlying principles. For instance, in combination with a slowly rotating shaft, the chamber may be stationary and the baffle may be secured to the rotating shaft, in which case the baffle would be provided with surfaces having radial components to produce a pumping action. It is also within the scope of this invention to apply the novel features thereof to a liquid seal between a stationary shaft and a rotatable housing. For high speeds, the seal chamber would be attached to the rotatable housing and the baffle attached to the shaft, while for low speeds the reverse arrangement would be satisfactory. An example of the first-mentioned alternative form of seal to which the novel features may be applied, is shown in Fig. 5 of the patent to Earl Mendenhall and Junius B. Van Horn, No. 1,879,626.

We claim:

1. A liquid seal for use between a rotating shaft and a stationary member, comprising in combination: an enlargement on said shaft terminating at its upper end in an upwardly facing shoulder continuous with and extending outwardly from said shaft; a shell secured at its lower end to said enlargement and extending upwardly in spaced coaxial relation thereto, the upper portion of said shell above said enlargement being constricted to form a neck of smaller diameter than the shaft enlargement; and an annular baffle secured to said stationary member and extending downwardly into the space between said shaft and said shell to a point below said shoulder, said shell containing sealing liquid having its upper surface adjacent said shoulder when said shaft is rotating.

2. A liquid seal as defined in claim 1, in which said enlargement is tapered inwardly and downwardly for at least a portion of its length below said shoulder.

3. A liquid seal for sealing the juncture of a rotatable member and a stationary member, comprising in combination: a receptacle secured to one of said members and having walls defining an annular chamber in the lower portion thereof containing a body of sealing liquid, the upper portion of said receptacle being reduced internally to form a neck of smaller diameter than the diameter of the major portion of the inner surface of said chamber; and a baffle secured to the other of said members and having a lower skirt portion extending into said sealing liquid and an upper reduced portion extending through said neck.

4. A liquid seal for sealing the juncture of a stationary member and a rotatable shaft comprising, in combination: a receptacle secured to said shaft and having walls defining an upper reduced annular neck passage and a lower annular chamber containing a body of sealing liquid, an annular baffle secured to said stationary member, said baffle having a skirt extending into said sealing liquid and an upper reduced neck dividing the said neck passage into two relatively narrow concentric annular channels; the inner wall of said receptacle having an upwardly facing surface located a substantial distance above the lower extremity of the baffle skirt and extending transversely beneath the outer of said channels, said sealing liquid having a surface terminating at a predetermined location on said upwardly facing surface during rotation; and a constriction in said outer channel providing a throttling passage to check upward surge of sealing liquid through said outer channel during acceleration, whereby said sealing liquid surface gradually approaches and comes to rest at said predetermined location without over-running said location.

5. A liquid seal as defined in claim 3, and an overflow chamber in said receptacle positioned above and communicating with said annular chamber, said sealing liquid partially filling said overflow chamber at all times.

6. A liquid seal comprising in combination an annular rotatable receptacle containing a sealing liquid, an annular stationary baffle depending downwardly into said sealing liquid and dividing the surface thereof into a plurality of separated surfaces adapted to be contacted by fluids to be isolated by the seal, in which at least a portion of the inner surface of said baffle extending into said sealing liquid converges downwardly and inwardly.

7. A liquid seal comprising in combination an annular rotatable receptacle containing a sealing liquid, an annular stationary baffle depending downwardly into said sealing liquid and dividing the surface thereof into a plurality of separated surfaces adapted to be contacted by fluids to be isolated by the seal, in which at least a substantial portion of the inner surface of said baffle converges downwardly and inwardly and at least a substantial portion of the outer surface of said baffle within said liquid converges inwardly and upwardly.

8. A liquid seal for sealing the juncture of a stationary member and a rotatable member, rotatable about a vertical axis, comprising a receptacle secured to the rotatable member and having walls defining an annular chamber closed at the bottom, said chamber comprising a lower portion of relatively large diameter containing a body of sealing liquid, an upper neck portion of smaller exterior diameter than the interior diameter of said lower portion and an outwardly and downwardly extending intermediate portion interconnecting said lower and upper portions, a baffle secured to said stationary member and extending into said receptacle and having an upper reduced portion, an outwardly downwardly extending intermediate portion, and a large lower portion whereby said baffle conforms generally to the shape of said chamber and is spaced from the walls thereof, said baffle dividing the sealing liquid into two bodies having separate free surfaces lying in the intermediate portion of said chamber, said receptacle having radial surfaces on its inner and outer walls adjacent said two sealing liquid surfaces for setting up closed circulation of said sealing liquid in radial planes adjacent said liquid surfaces.

9. A liquid seal as described in claim 1, in which said baffle extends outwardly and downwardly in close proximity to and above said shoulder whereby the area of free surface of said sealing liquid between said enlargement and baffle, when the shaft is rotating, is small.

10. A liquid seal as described in claim 1, in which said baffle extends outwardly and downwarly in close proximity to and above said shoulder whereby the area of free surface of said sealing liquid between said enlargement and baffle, when said shaft is rotating, is small, and in which said baffle extends upwardly in close proximity to said shaft above said outwardly and downwardly extending portion, whereby the volume of external fluid within the seal structure is reduced.

11. A liquid seal as described in claim 1, in which said shell is enlarged above said neck portion thereof to provide an overflow chamber and said baffle extends in close proximity to said shaft above the upper level of said sealing liquid, the volume of said overflow chamber being large in comparison with the volume of the clearance between said shaft and the upper portion of said baffle.

12. A liquid seal as described in claim 1, in which the upper end of said enlargement on said shaft is stepped to provide a plurality of upwardly facing shoulders, including said first mentioned shoulder, longitudinally and radially spaced from each other.

13. A liquid seal comprising a rotatable receptacle defining an annular chamber containing a sealing liquid and a stationary annular baffle depending downwardly into said sealing liquid, in which the wall of said receptacle exterior of said baffle is shaped to define a plurality of downwardly facing shoulders in stepped relation to each other positioned adjacent the free surface of said sealing liquid when the receptacle is rotating.

ALADAR HOLLANDER.
VAINO A. HOOVER.